(12) United States Patent
Yu et al.

(10) Patent No.: US 8,047,361 B2
(45) Date of Patent: Nov. 1, 2011

(54) GAS STORAGE STRUCTURE AND GAS STORAGE APPARATUS INCLUDING THE SAME

(75) Inventors: Han-Young Yu, Daejeon (KR);
Byung-Hoon Kim, Incheon (KR);
Soon-Young Oh, Daejeon (KR);
Yong-Ju Yun, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 288 days.

(21) Appl. No.: 12/463,023

(22) Filed: May 8, 2009

(65) Prior Publication Data

US 2010/0155264 A1 Jun. 24, 2010

(30) Foreign Application Priority Data

Dec. 22, 2008 (KR) ........................ 10-2008-0130960

(51) Int. Cl.
*F17C 11/00* (2006.01)
*C01B 3/00* (2006.01)

(52) U.S. Cl. ........................ 206/0.7; 502/526; 977/962

(58) Field of Classification Search ............... 206/0.6, 206/0.7; 96/108, 146; 423/648.1, 658.2; 420/900; 502/526; 977/724, 745, 962
See application file for complete search history.

(56) References Cited

U.S. PATENT DOCUMENTS

| | | | |
|---|---|---|---|
| 6,432,176 B1* | 8/2002 | Klos et al. ..................... 96/117.5 |
| 7,320,726 B2* | 1/2008 | Shih et al. ......................... 96/154 |
| 7,323,043 B2* | 1/2008 | Finamore ......................... 96/146 |
| 7,870,878 B2* | 1/2011 | Zhevago et al. ................... 141/2 |
| 2004/0191589 A1 | 9/2004 | Katamura et al. |
| 2005/0035003 A1* | 2/2005 | Kelley et al. .................... 206/0.7 |
| 2007/0231184 A1* | 10/2007 | Kohno et al. ................... 420/402 |

FOREIGN PATENT DOCUMENTS

| | | |
|---|---|---|
| JP | 2003-154260 | 5/2003 |
| JP | 2004-059409 | 2/2004 |
| KR | 2007-0015841 | 2/2007 |
| KR | 0738651 | 7/2007 |
| KR | 2008-0043856 | 5/2008 |

* cited by examiner

*Primary Examiner* — Frank Lawrence, Jr.
(74) *Attorney, Agent, or Firm* — Rabin & Berdo, PC

(57) ABSTRACT

Provided are a gas storage structure and a gas storage apparatus including the gas storage structure. The gas storage structure includes a gas storage part including an opening thereon and an entrance control part disposed on the opening and including a gate.

18 Claims, 8 Drawing Sheets

GAS STORAGE STRUCTURE AND GAS STORAGE APPARATUS INCLUDING THE SAME

CROSS-REFERENCE TO RELATED APPLICATIONS

This U.S. non-provisional patent application claims priority under 35 U.S.C. §119 of Korean Patent Application No. 10-2008-0130960, filed on Dec. 22, 2008, the entire contents of which are hereby incorporated by reference.

BACKGROUND

The present invention disclosed herein relates to a gas storage structure and a gas storage apparatus including the same.

A gaseous material is widely used in various industry fields such as an energy industry. In particular, the next generation energy development using the gaseous material is being spotlighted due to exhaustion of the fossil energy. Thus, researches with respect to the next generation energy development are being actively progressed.

However, it is difficult to store and/or use the gaseous material due to various characteristics of a gaseous state. For example, in case where a material exists in the gaseous state, it is difficult to store and control the material due to their great volume.

SUMMARY

The present invention provides a gas storage structure in which a gas is easily stored and a gas storage apparatus including the gas storage structure.

The present invention also provides a gas storage structure in which injection and exhaust of a gas are easily controlled and a gas storage apparatus including the gas storage structure.

Embodiments of the present invention provide gas storage structures include a gas storage part defining an inner space for storing a gas and including an opening thereon; and an entrance control part disposed on the opening, the entrance control part including a gate.

In some embodiments, the gas storage part may include a porous structure.

In other embodiments, an outer wall of the gas storage part may be defined by lattice spaces of the porous structure.

In still other embodiments, the gate may have a size greater than that of a lattice space of the gas storage part at a temperature higher than a critical temperature to move the gas through the gate, and the critical temperature may be higher than that of a vaporization point of the gas and lower than that of a melting point of the entrance control part.

In even other embodiments, the gate may have a size equal to or less than that of the lattice space of the gas storage part at a temperature lower than the critical temperature.

In yet other embodiments, the entrance control part may be formed of a material having a melting point lower than that of a material constituting the gas storage part.

In other embodiments of the present invention, gas storage apparatuses include a chamber for maintaining a space therein in a vacuum state; a heating unit disposed within the chamber; a cooling unit disposed within the chamber; and a gas storage structure disposed within the space. The gas storage structure may include a gas storage part defining an inner space for storing a gas and including an opening connecting the inner space to an outer space, and an entrance control part disposed on the opening and including a gate.

In some embodiments, the gas storage part may include a porous structure including lattice spaces, each having a size less than that of the opening.

In other embodiments, the entrance control part may be formed of a material having a melting point less than that of a material constituting the gas storage part.

In still other embodiments, the heating unit and the cooling unit may heat or cool the entrance control part to control a size of the gate.

BRIEF DESCRIPTION OF THE FIGURES

The accompanying figures are included to provide a further understanding of the present invention, and are incorporated in and constitute a part of this specification. The drawings illustrate exemplary embodiments of the present invention and, together with the description, serve to explain principles of the present invention. In the figures.

DETAILED DESCRIPTION OF EMBODIMENTS

Preferred embodiments of the present invention will be described below in more detail with reference to the accompanying drawings. These embodiments are provided so that this disclosure will fully convey the scope of the present invention to those skilled in the art, and the present invention is not limited thereto. The invention may be embodied in many different forms without departing from the spirit and scope of the present invention as defined by the following claims. As used herein, the term 'and/or' includes any and all combinations of one or more of the associated listed items. It will also be understood that when a component is referred to as being 'on' another component, it can be directly on the other component, or intervening components may also be present. In the figures, the thicknesses of components and a relative thickness are exaggerated for clarity of illustration. Also, elements illustrated in drawings and materials or apparatuses including the elements are illustrated for explaining the scope of the present invention and may be different from actual elements and material or apparatuses the actual elements.

Figure 1:
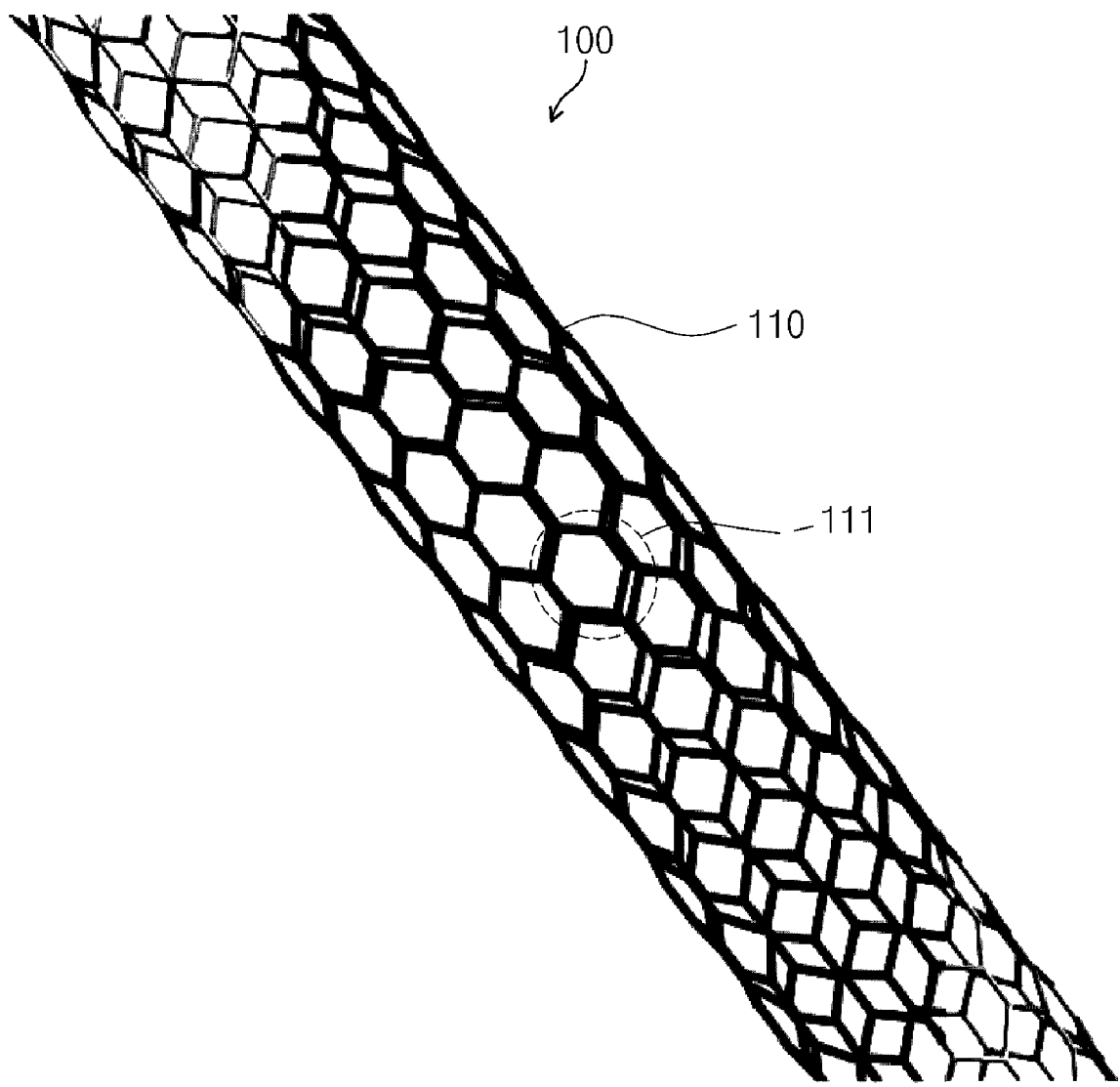
FIGS. 1 to 4 are views illustrating a method of forming a gas storage structure according to an embodiment of the present invention.

Referring to FIGS. 1 to 4, a method of forming a gas storage structure 100 according to an embodiment of the present invention will be described. Referring to FIG. 1, a gas storage part 110 is prepared. The gas storage part 110 includes an inner space for storing gases. The gas storage part 110 may have lattice spaces 111 defined in a surface thereof. The gas storage part 110 may include a porous structure. The porous structure may be formed of at least one of a metal, a metallic compound, a nonmetal, and a nonmetallic compound. For example, the gas storage part 110 may include one of carbon-based nano-structures including carbon nanotube, fullerene, and carbon fiber. For another example, the gas storage part 110 may include one of porous structures including zeolite.

Thus, although the carbon nanotube that is one of the carbon-based nano-structures is described in this embodiment as an example, the present invention is not limited thereto.

The lattice spaces 111 may be spaces defined by atoms and/or molecules constituting an outer wall of the gas storage part 110. In case of the carbon nanotube, a space defined by six carbon atoms may be each of lattice spaces 111 of the gas storage part 110. On the other hand, in case where the gas storage part 110 is formed of porous polymer, the lattice spaces 111 may be spaces defined by atoms and/or molecules constituting the polymer. In case where the gas storage part 110 includes a multi-layer, the lattice spaces 111 may be formed by stacks of the lattice spaces 111 of each of the layers. A size of each of the lattice spaces 111 may not be enough for incoming and outgoing gas. Thus, in case where the gas is stored within the gas storage part 110 having the outer wall defined by the lattice spaces 111, the gas may be minimally exhausted through the lattice spaces 111.

Figure 2:
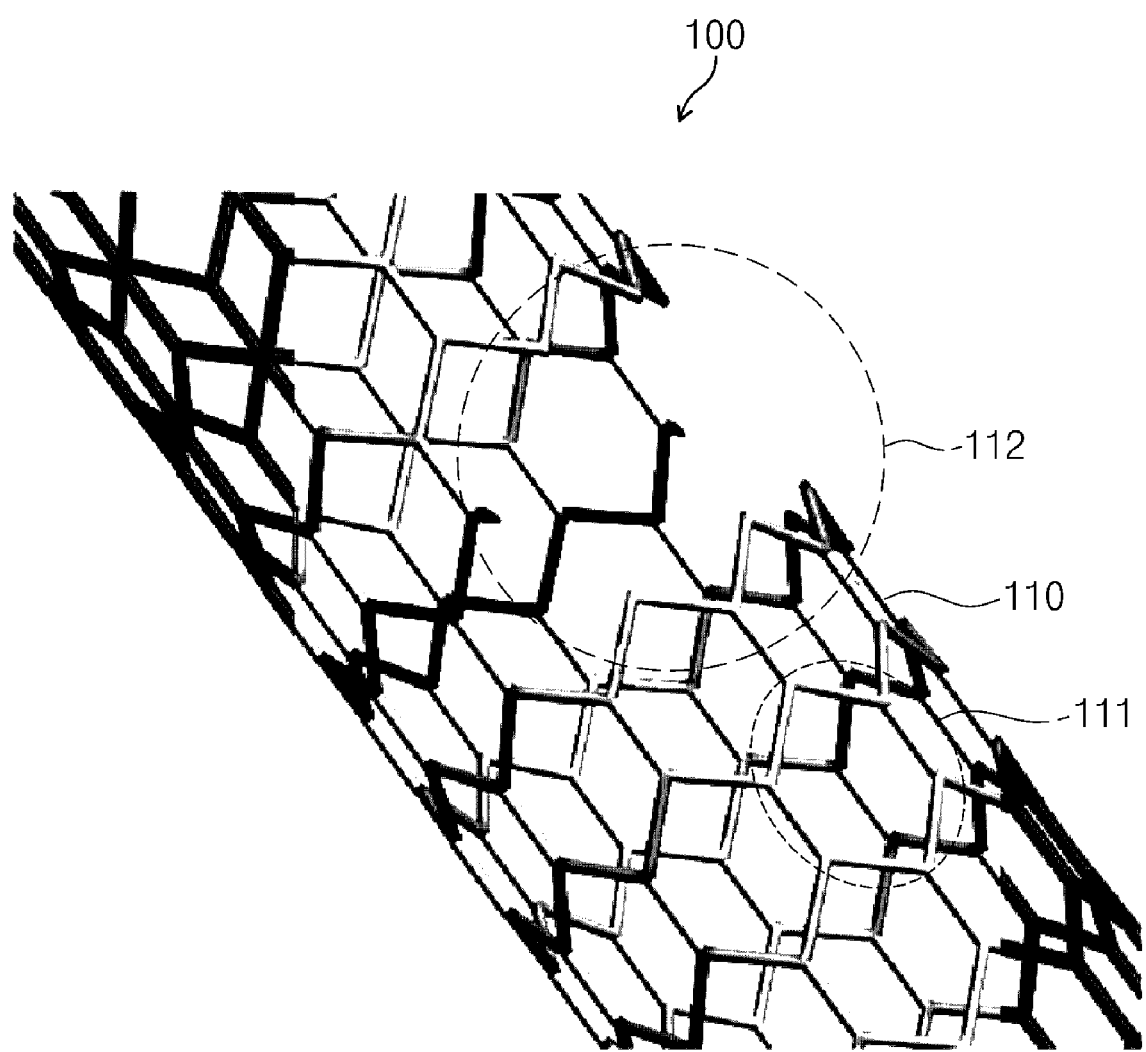

Referring to FIG. 2, at least one opening 112 may be formed in the surface of the gas storage part 110. The opening 112 may be greater than the lattice space 111. For example, a perimeter of the opening 112 may be greater than that of the lattice space 111. The opening 112 may be defined as a passage passing connecting an inner space to an outer space of the gas storage part 110. As illustrated in FIG. 2, the opening 112 may be formed in a portion at which a column of the gas storage part 110 is built as well as at least one of both ends of the gas storage part 110.

The opening 112 may be formed by making a scar on a portion of the surface of the gas storage part 110. For example, in case where the gas storage part 110 is formed of the carbon nanotube, the carbon nanotube is soaked in an acid solution with irradiation of ultrasonic waves thereon, thereby forming the opening 112. At this time, a portion of a bonding between the carbons constituting the carbon nanotube may be broken so that the scar is formed. For another example, plasma may be irradiated onto the surface of the gas storage part 110 to form the opening 112. A size of the opening 112 may be equal to that of the sum of the plurality of lattice spaces 111.

In case where the gas storage part 110 includes one of the carbon-based nano-structures, a bonding between a portion of the carbon atoms and/or the carbon atoms may be released to connect the plurality of lattice spaces 111 to each other, thereby forming the opening 112. In this case, one carbon atom constituting the opening 112 may include an electron that does not take part in a bonding with the other carbon atom. Particularly, in case where the carbon nanotube is scarred to form the opening 112, a bonding between the one carbon atom and the other carbon atom may be broken. Thus, the one carbon atom constituting the opening 112 may include at least one valence electron that does not take part in the bonding with the other carbon atom.

Figure 3:
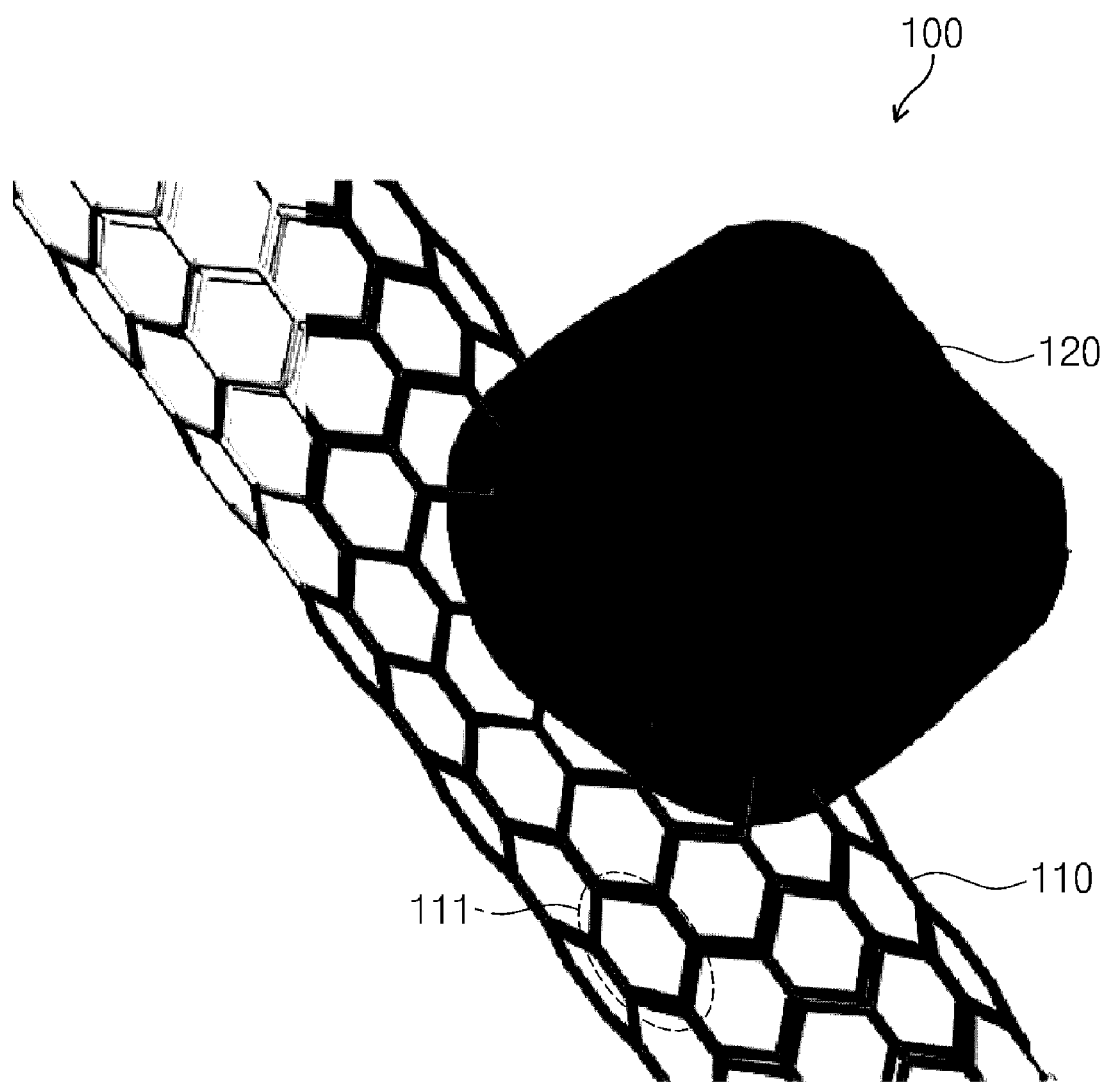

Referring to FIG. 3, an entrance control part 120 may be mounted in and/or on the opening 112 of the gas storage part 110. The entrance control part 120 may cover at least portion of the opening 112. The entrance control part 120 may fill at least portion of the opening 112. In this embodiment, the entrance control part 120 may be formed on and/or within the opening 112 due to a bonding, electrostatic attraction, and/or absorption between the carbon atom constituting the opening 112 and a material forming the entrance control part 120. For example, the entrance control part 120 may be mounted in and/or on the gas storage part 110 due to an interaction between the carbon including the electron that does not take part in a coupling with another carbon atom and the material forming the entrance control part 120.

Alternatively, the entrance control part 120 may be mounted in and/or on the opening 112 by an intermediary molecule. For example, the intermediary molecule may be attached to the material forming the entrance control part 120, and then the material to which the intermediary molecule is attached may be attached to the opening 112 to install the entrance control part 120 in the opening 112. For example, the intermediary molecule may include molecules having thiol group (—SH) and/or silane group. The intermediary molecule may connect the entrance control part 120 to the opening 112.

The entrance control part 120 may be formed of a material having a melting point lower than that of the material forming the gas storage part 110. For example, the entrance control part 120 may be formed of at least one of various polymers attachable to the gas storage part 110. For example, the entrance control part 120 may be formed of at least one of polypyrrole, polyanyline, polyphenol, and polyparaphenyline, but not limited thereto.

Figure 4:
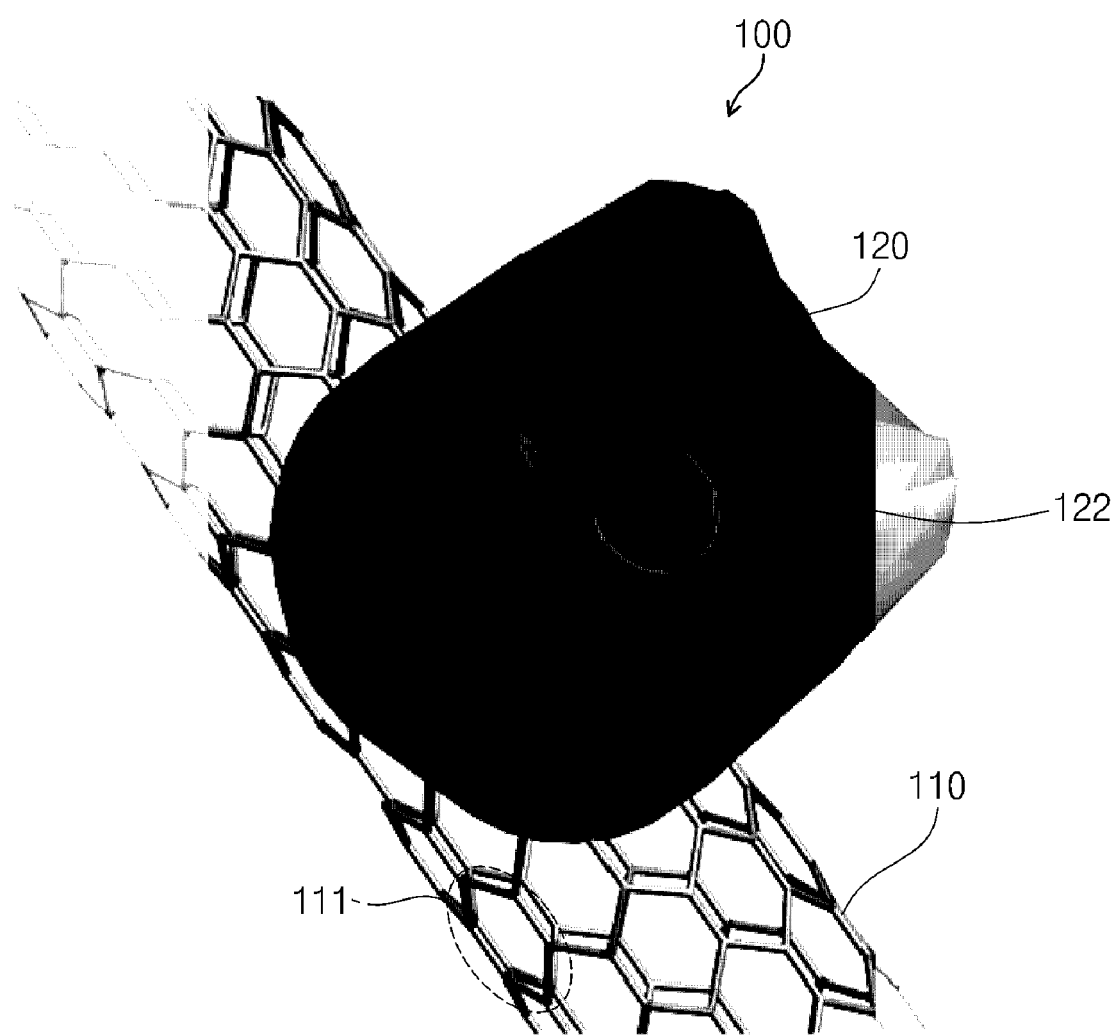

Referring to FIG. 4, the entrance control part 120 may include at least one gate 122 connecting the inner space of the gas storage part 110 to the outer space of the gas storage part 110. The gate 122 may be a space defined by atoms and/or molecules constituting the entrance control part 120. The gate 122 may be changed in size according to various conditions including a temperature. For example, in case when the entrance control part 120 is heated, movements of the atoms and/or the molecules constituting the entrance control part 120 are active so that a space between the atoms and/or the molecules is expanded. As a result, the size of the gate 122 may be expanded. In this specification, a temperature at which the gate 122 has the substantially same size as the lattice space 111 of the gas storage part 110 is defined as a critical temperature. The critical temperature may be a temperature higher than that of a vaporization point of gases injected into the gas storage part 110 and less than that of a melting point of the entrance control part 120. That is, in case where the entrance control part 120 is heated at a temperature higher than the critical temperature, since the gate is expanded in size to have a size greater than that of the lattice space 111, a gas movement via the expanded gate 122 may be easy than a gas movement via the lattice space 111. Thus, the gases may be further easily injected into the gas storage part 110 and exhausted to the outside of the gas storage part 110 through the expanded gate 122.

On the other hand, in case where the entrance control part 120 is cooled, the movements of the atoms and/or the molecules constituting the entrance control part 120 are inactive so that the space between the atoms and/or the molecules may become narrower. Thus, the gate 122 may be reduced in size. For example, the gate 122 may have a size less than or equal to that of the lattice space 111 at a temperature lower than the critical temperature. Since the reduced gate 120 has the size less than or equal to that of the lattice space 111, the incoming and outgoing gases may controlled through the reduce gate 120. Thus, the gases may be stably stored within the gas storage part 110.

Again referring to FIG. 4, the gas storage structure 100 according to an embodiment of the present invention will be described. A portion of previously described contents will be omitted. Referring to FIG. 4, the gas storage part 110 having the lattice spaces is provided. The gas storage part 110 may be formed of a porous material. For example, the gas storage part 110 may include the carbon-based nano-structure including carbon nanotube, fullerene, and carbon fiber. For another example, the gas storage part 110 may include one of porous structures including zeolite. Thus, although the carbon nanotube that is one of the carbon-based nano-structures is described in this embodiment as example, the present invention is not limited thereto.

The gas storage part 110 may have the opening 112. The opening 112 may be the passage passing connecting the inner space to the outer space of the gas storage part 110. The opening 112 may have a size greater than that of the lattice space 111. For example, the opening 112 may have a shape formed by the sum of the plurality of lattice spaces 111.

Figure 5:
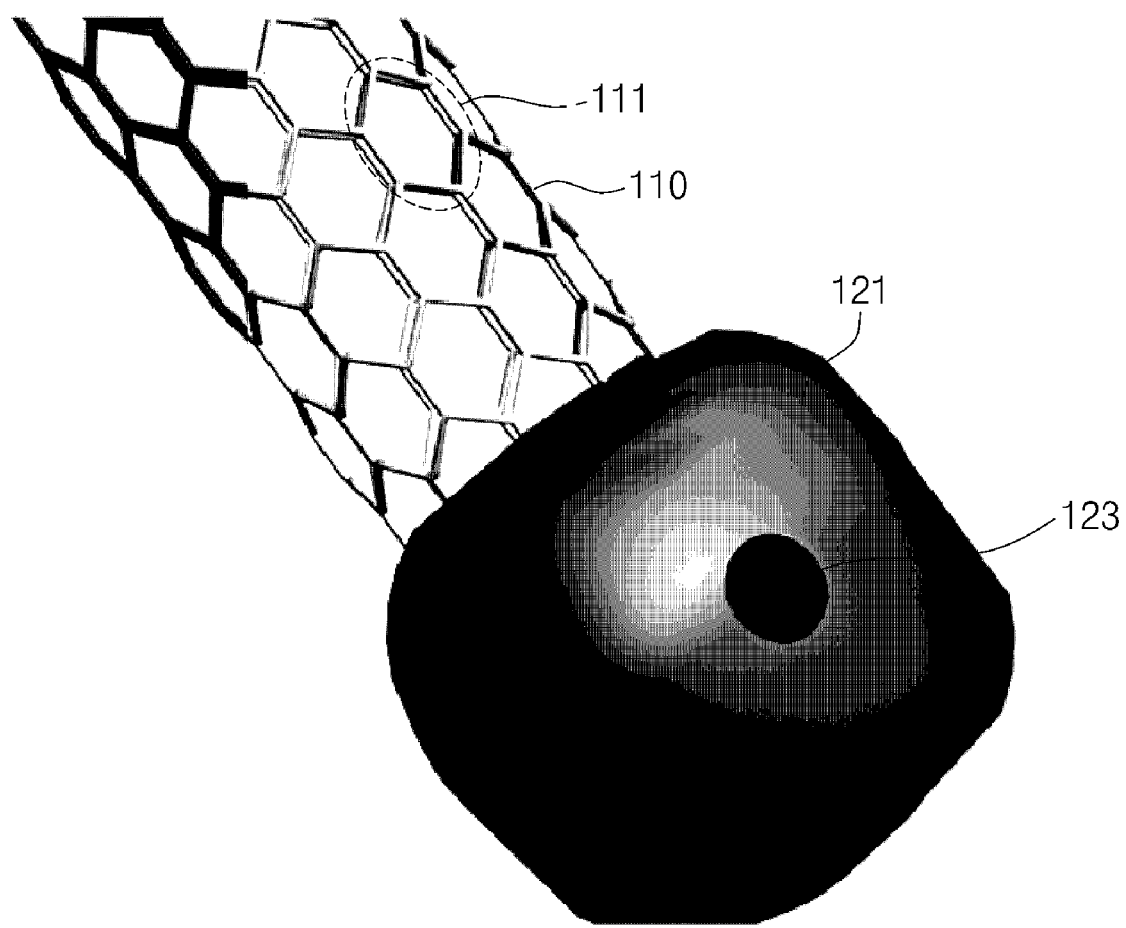
FIG. 5 is a view of a gas storage structure according to another embodiment of the present invention.

The entrance control part 120 may be formed in and/or on the opening 112. The entrance control part 120 may be disposed on and/or in the opening 112. The entrance control part 120 may be formed of a material having a melting point lower than that of the gas storage part 110. For example, the entrance control part 120 may be formed of the polymer having a melting point less than that of the gas storage part 110. Referring to FIG. 5, a entrance control part 121 may be formed on one end of the carbon nanotube. A portion of the entrance control part 121 may be extended into the inner space of the gate storage part 110. As the above-described embodiment, the entrance control part 121 may include the gate 123. Also, a plurality of entrance control parts 121 and/or openings may exist in one carbon nano tube. For example, the entrance control parts 120 and the openings may be disposed on both ends of the carbon nanotube and/or a column portion connecting the both ends to each other.

Again referring to FIG. 4, the entrance control part 120 may include the gate 122. The gate 122 may be defined by lattices or an overlapping of the lattices of the materials constituting the entrance control part 120. The gate 122 may be changed in size according to a temperature. For example, when a high temperature is provided, since the movements of the atoms and/or the molecules constituting the entrance control part 120 are active, distances between the atoms and/or the molecules may become wide to expand the size of the gate 122. For example, the gate 122 may be largely expanded than the lattice space 111 of the entrance control part 120 at a temperature higher than the critical temperature. On the other hand, when a temperature lower than the critical temperature is applied to the entrance control part 120, the gate 122 may have a size less than or equal to that of the lattice space 111. For convenience of explanation, although the gate 122 has a tube shape passing through the entrance control part 120 in reference drawings, the gate 122 is not limited to their shape. For example, various shapes defined by a space between the atoms and/or the molecules constituting the entrance control part 120 may be applied.

The gases flowing into/from the gas storage part 110 may be adjusted according to a size change of the gate 122. For example, in case where the gate 122 is expanded to have a size greater than that of each of the lattice spaces 111 of the gas storage part 110, the gases may be easily injected into the gas storage part 110. On the other hand, in case where the gate 122 is reduced in size to have a size less than that of each of the lattice spaces 111 of the gas storage part 110, the gases injected into the gas storage part 110 may be minimally exhausted to the outside of the gas storage part 110. As described above, since the size of the gate 122 can be adjusted by controllable factors such as a temperature. Therefore, injection, storage, and/or exhaustion of the gases may be easily controlled.

In particular, the gate 122 may have a size greater than that of the lattice space 111 of the gas storage part 110 at a temperature higher than the critical temperature. Thus, when the gases are injected into the gas storage part 110 via the gate 122, the gases may be easily injected into the gas storage part 110 than a case in which the gases are injected into the gas storage part 110 via the lattice space 111.

On the other hand, the gate 122 may have a size less than that of the opening 112 of the gas storage part 110 at a temperature less than the critical temperature. The gate 122 may be reduced to a size less than or equal to that of the lattice space 111. Thus, the gases stored within the gas storage part 110 may be minimally exhausted to the outside. Therefore, the gas storage structure 100 including the gas storage part 110 and the entrance control part 120 may have enhanced gas storage capacity.

Figure 6:
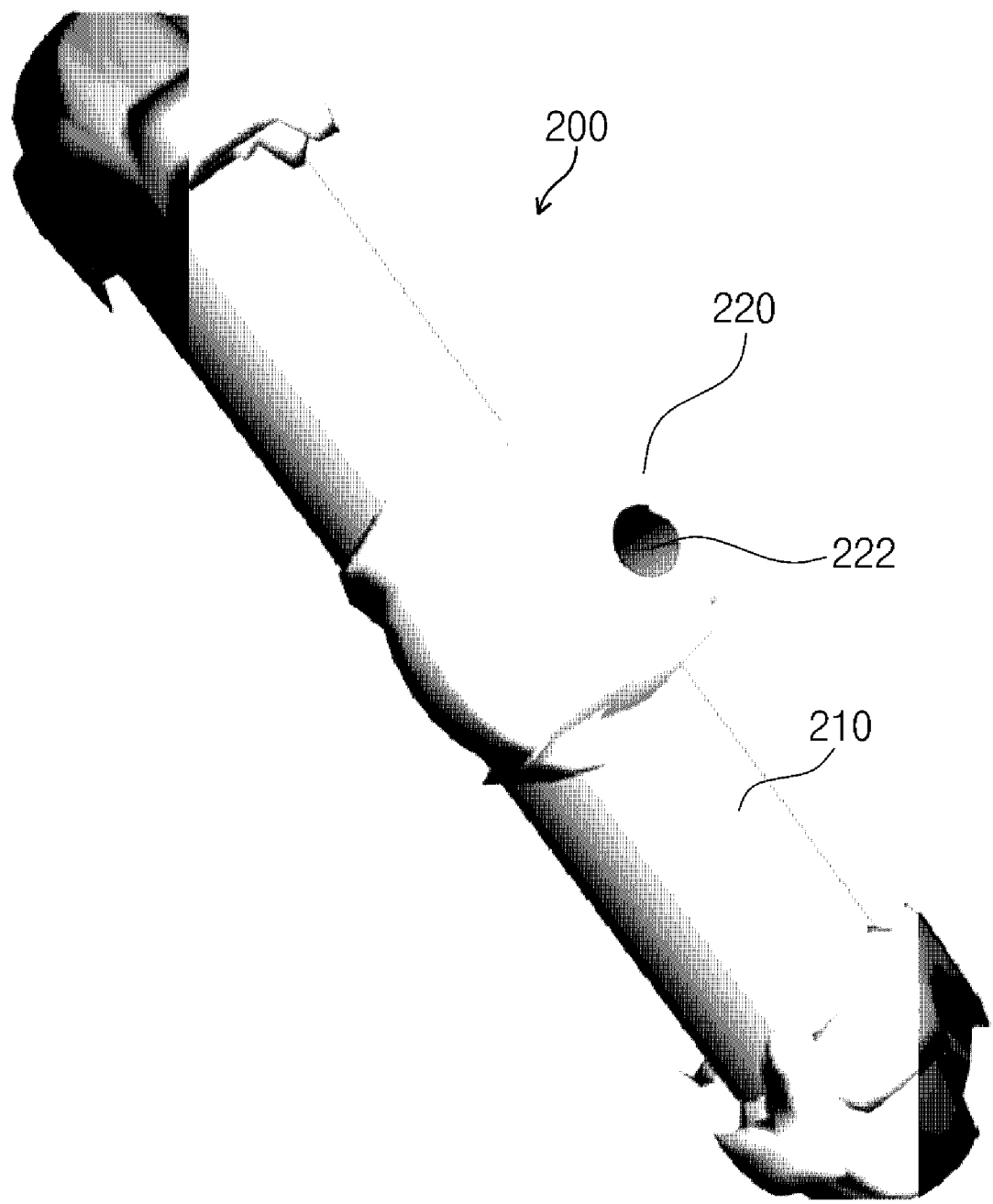
FIG. 6 is a view of a gas storage structure according to another embodiment of the present invention.
Figure 7:
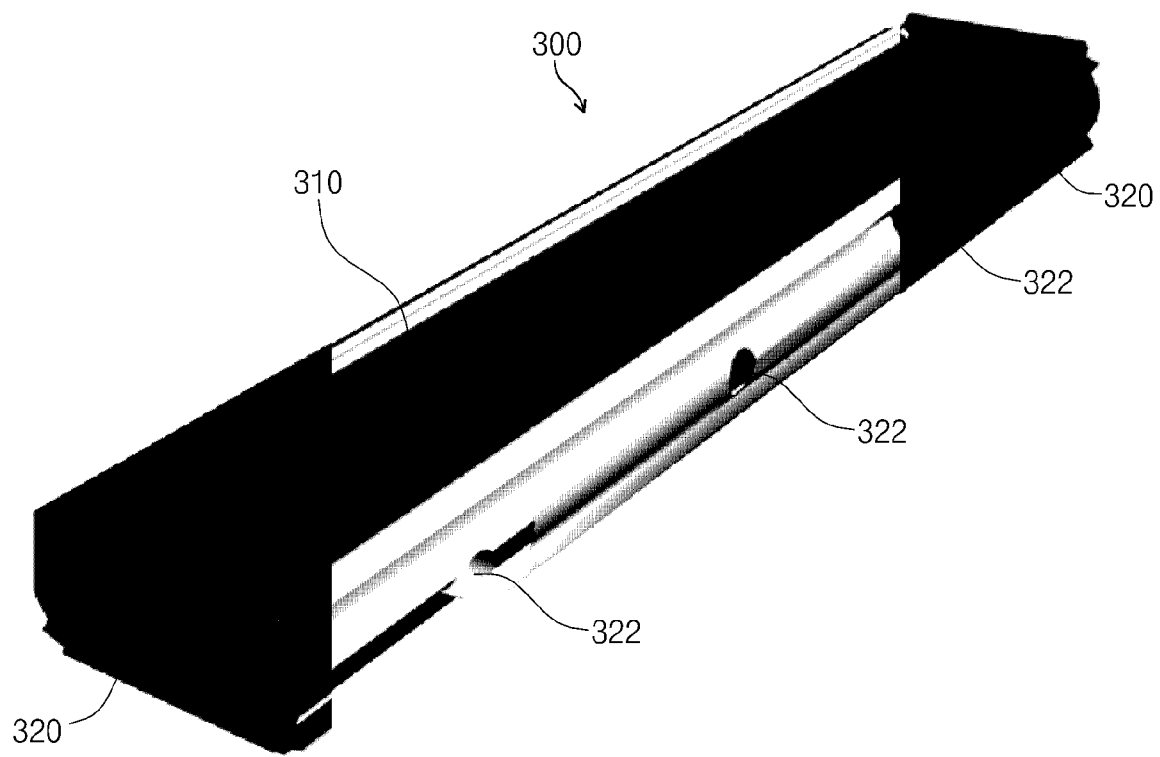
FIG. 7 is a view of a gas storage structure according to another embodiment of the present invention.

Referring to FIGS. 6 and 7, gas storage structures according to another embodiment of the present invention will be described. Referring to FIG. 6, a gas storage part 210 formed of nano fiber is prepared. The gas storage structure 200 according to this embodiment may include the gas storage part 210 having an opening and an entrance control part 220 disposed on the opening. The entrance control part 220 may include a gate.

The gas storage part 210 may include the nano fiber. The nano fiber may be formed of at least one of various materials including a metal, a metallic compound, a nonmetal, and a nonmetallic compound. The gas storage part 210 may provide an inner space for storing gases in the gas storage part 210. A lattice space may be defined in a surface of the gas storage part 210. The lattice space may be a space defined by atoms and/or molecules constituting the entrance control part 220. The lattice space may have a size in which the gases do not smoothly flow into/from the gas storage part 210.

The opening having a size greater than that of the lattice space may be defined in the surface of the gas storage part 210. A portion of a bonding between the atoms and/or the molecules constituting the gas storage part 210 may be broken to form the opening. In case where the gas storage part 210 is formed of polymer, to break a bonding between the molecules denotes a portion of a coupling between monomers constituting the polymer. On the other hand, the opening may be a space defined by the atoms and/or the molecules disposed on both ends of the nano fiber. In this case, the atoms and/or the molecules may define the lattice space as well as the opening.

The entrance control part 220 may be installed on an end portion and/or a surface of the gas storage part 210. The entrance control part 220 may cover the opening. The entrance control part 220 may be formed of a material having a melting point lower than that of the gas storage part 210. For example, the entrance control part 220 may be formed of the polymer having a melting point lower than that of the gas storage part 210.

The entrance control part 220 may include a gate 222. The gate 222 may be a space defined by atoms and/or molecules constituting the entrance control part 220. Size of the gate 222 may be changeable according to a temperature. For example, the gate 222 may have a size greater than that of the lattice space of the gas storage part 210 at a temperature higher than a critical temperature. The gate 222 may have a size less than or equal to that of the lattice space at a temperature less than the critical temperature. The critical temperature may be greater than that of a vaporization point of injected gases and less than that of a melting point of the entrance control part 220.

The gate 222 may be expanded to a size greater than that of the lattice space of the gas storage part 210 at the temperature higher than the critical temperature. As a result, the gases may smoothly flow through the expanded gate 222. The gate 222 may have a size less than or equal to that of the lattice space of the gas storage part 210 at a temperature lower than or equal to the critical temperature. Thus, the gases stored within the gas storage part 210 may be minimally exhausted to the outside.

FIG. 7 is a view of a gas storage structure according to another embodiment of the present invention. In this embodiment, a gas storage part 310 may include a structure including a plurality of layers. For example, the gas storage part 310 may include a structure in which a plurality of nano structures having plate shapes is stacked. For specific example, the plurality of layers may be formed of vanadium pentoxide ($V_2O_5$). The structures having the plate shapes may be spaced from each other. That is, an empty space may exist between the pluralities of layers.

The space between the pluralities of layers may be defined as an inner space of the gas storage part 310. In addition, the space between the pluralities of layers may be defined also as an opening. That is, in this embodiment, the opening and the inner space of the gas storage part 310 may have the same region. Each of the nano structures constituting the gas storage part 310 may have a lattice space. The lattice space may be a space defined by atoms and/or molecules constituting each of the layers. The lattice space may have a size in which the gases do not smoothly flow into/from the gas storage part 310. Thus, the gases stored in the inner space of the gas storage part 310 may not smoothly flow through the lattice space.

Lateral surfaces of the gas storage part 310 may be surrounded by the entrance control part 320. The entrance control part 320 may be formed of a material having a melting point lower than that of the gas storage part 310. For example, the entrance control part 320 may be formed of polymer having a melting point lower than that of the gas storage part 310. The entrance control part 320 may include a gate 322. The gate 322 may be a space defined by atoms and/or molecules constituting the entrance control part 320. The gate 322 may be changed in size according to a temperature. For example, the gate 322 may have a size greater than that of the lattice space at a temperature higher than a critical temperature. The gate 322 may have a size less than or equal to that of the lattice space at a temperature lower than the critical temperature. The critical temperature may be higher than that of a vaporization point of injected gases and less than that of a melting point of the entrance control part 320.

In case where the gate 322 may be expanded to a size greater than that of the lattice space, the gases may smoothly flow through the expanded gate 322. On the other hand, in case where the gate 322 may be reduced to a size less than or equal to that of the lattice space, the incoming and outgoing gases may be controlled through the gate 322. Thus, injection, storage, and/or exhaustion of the gases may be easily controlled.

Figure 8:
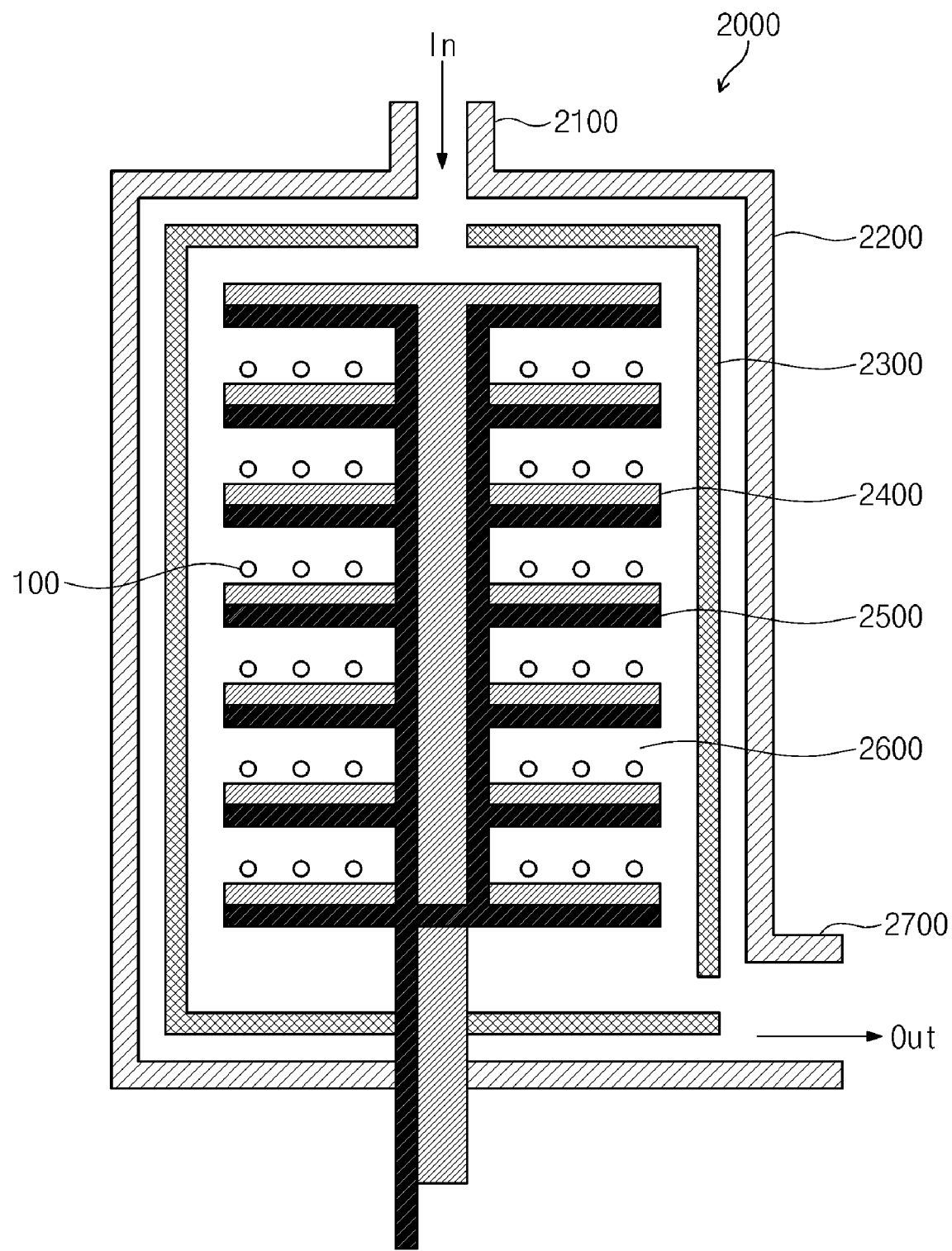
FIG. 8 is a view of a gas storage method and a gas storage apparatus according to embodiments of the present invention.

Referring to FIGS. 4 to 8, a gas treatment method using a gas storage structure 100 according to an embodiment of the present invention will be described. FIG. 8 is a view of a gas storage method and a gas storage apparatus according to embodiments of the present invention. A portion of the contents described with reference to FIGS. 1 to 4 will be omitted. Although a gas storage structure to which the gas storage structure of the FIG. 4 is applied is described in this embodiment, the present invention is not limited thereto. For example, the gas storage structure according to another embodiment may be applicable.

First, a gas storage apparatus 2000 of FIG. 8 will be described. The gas storage apparatus 2000 may include a storage chamber 2200, a heat insulator 2300, a cooling unit 2400, a heating unit 2500, and a space 2600 that is a space between the cooling unit 2400 and the heating unit 2500. The heat insulator 2300, the cooling unit 2400, the heating unit 2500, and the space 2600 are disposed within the storage chamber 2200. The cooling unit 2400 and the heating unit 2500 may be connected to the outside of the chamber 2200. The inside and the outside of the gas storage apparatus 2000 are connected to each other through an injection hole 2100 and exhaust hole 2700 of the storage chamber 2200. At least one gas storage structure 100 according to embodiments of the present invention is disposed in the space 2600.

A method of injecting gases into the gas storage structure 100 will be described. Although hydrogen is injected into the gas storage structure 100 in this embodiment, different gases may be applied to this embodiment.

The hydrogen gas is injected into the gas storage apparatus 2000 through the injection hole 2100. The chamber 2200 may be in substantial vacuum state before the hydrogen gas is injected. After the hydrogen gas is injected, a temperature within the chamber 2200 is set to a temperature higher than the critical temperature using the heating unit 2500. The critical temperature denotes a temperature at which the gate 122 of the entrance control part 120 is expanded to a size equal to that of the lattice space 111 of the gas storage part 110. The gate 122 may be expanded to a size greater than that of the lattice space 111 due to the heat provided into the chamber 2200.

The hydrogen gas is injected into the gas storage part 110. The hydrogen gas may be injected into the gas storage part 110 via the expanded gate 122. At this time, since the gate 122 has the size greater than that of the lattice space 111 of the gas storage part 110, the gas may be injected into the gas storage part 110 than a case in which the gas is injected into the gas storage part 110 through the lattice space 111.

The hydrogen gas may be further easily injected into the gas storage part 110 due to an increased pressure within the chamber 2100. In particular, in case where the hydrogen gas is injected into the chamber 2100, a pressure within the chamber 2100 may increase by the hydrogen gas. In an initial injection process of the hydrogen gas, the outside of the gas storage part 110 may have a pressure greater than that of the inside of the gas storage part 110. Thus, the hydrogen gas may be easily injected into the gas storage part 110 due to the pressure of the outside of the gas storage part 110. At this time, since the hydrogen gas is absorbed on an inner surface of the gas storage part 110, the hydrogen gas may be stored in the gas storage part 110. On the other hand, since pressure gradient of the inside and the outside of the gas storage part 110 may be generated by a different unit that can provide a high pressure to the inside of the chamber 2100, the hydrogen gas may be injected and/or stored into the gas storage part 110.

In case where the hydrogen gas is sufficiently injected into the gas storage part 110, the chamber 2100 may be cooled using the cooling unit 2400. As a temperature within the chamber 2100 decreases, the gate 122 of the entrance control part 120 may be reduced in size. For example, the gate 122 may be reduced to a size less than or equal to that of the lattice space defined in the surface of the gas storage part 110. As a result, the hydrogen gas injected into the gas storage part 110 may be minimally exhausted to the outside of the gas storage part 110 via the gate 122. Thus, the hydrogen gas may be stably stored in the gas storage part 110.

Next, a method of exhausting the hydrogen gas from the gas storage structure 100 will be described. The inside space of the chamber 2200 may increase at a temperature higher than the critical temperature. As a result, the gate 122 of the gas storage structure 100 may be expanded. The hydrogen gas within the gas storage part 110 may be exhausted through the expanded gate 122. In an initial process in which the hydrogen gas is exhausted to the outside of the chamber 2100, a pressure of the inside of the gas storage part 110 may be greater than that of the outside of the gas storage part 110. the hydrogen gas within the gas storage part 110 may be exhausted to the outside of the gas storage part 110 by diffusion due to a pressure difference between the inside and the outside of the gas storage part 110. The gas exhausted from the gas storage part 110 may be exhausted to the outside of the gas storage apparatus 2000 through the exhaust hole 2700.

According to the embodiments of the present invention, the incoming and outgoing gases are controlled by the entrance control part on and/or in the opening defined in the surface of the gas storage part. The gases can be easily injected into the gas storage part through the entrance control part, and the injected gases can be stored in the gas storage part in a state where undesired exhaust is minimized. Also, the gases can be easily exhausted from the gas storage part by the entrance control part as necessary.

What is claimed is:

1. A gas storage structure, comprising:
   a gas storage part defining an inner space for storing a gas, the gas storage part comprising an opening connecting the inner space to an outer space, and a porous structure; and
   an entrance control part disposed on the opening, the entrance control part comprising a gate,
   wherein an outer wall of the gas storage part is defined by lattice spaces of the porous structure.

2. The gas storage structure of claim 1, wherein the gate has a size greater than that of a lattice space of the gas storage part at a temperature higher than a critical temperature, wherein the critical temperature is higher than that of a vaporization point of the gas and lower than that of a melting point of the entrance control part.

3. The gas storage structure of claim 2, wherein the gate has a size equal to or less than that of the lattice space of the gas storage part at a temperature less than the critical temperature.

4. A gas storage structure, comprising:
   a gas storage part defining an inner space for storing a gas, the gas storage part comprising an opening connecting the inner space to an outer space; and
   an entrance control part disposed on the opening, the entrance control part comprising a gate,
   wherein the entrance control part is formed of a material having a melting point less than that of a material constituting the gas storage part.

5. A gas storage apparatus comprising:
   a chamber for maintaining a space therein in a vacuum state;
   a heating unit disposed within the chamber;
   a cooling unit disposed within the chamber; and
   a gas storage structure disposed within the space,
   wherein the gas storage structure comprises a gas storage part defining an inner space for storing a gas and comprising an opening connecting the inner space to an outer space and an entrance control part disposed on the opening and comprising a gate.

6. The gas storage apparatus of claim 5, wherein the gas storage part comprises a porous structure comprising lattice spaces, each having a size less than that of the opening.

7. The gas storage apparatus of claim 5, wherein the entrance control part is formed of a material having a melting point lower than that of a material constituting the gas storage part.

8. The gas storage apparatus of claim 5, wherein the heating unit and the cooling unit heats and cools the entrance control part respectively to control a size of the gate.

9. A gas storage structure, comprising:
   a gas storage part defining an inner space for storing a gas, the gas storage part comprising an opening connecting the inner space to an outer space; and
   an entrance control part disposed on the opening, the entrance control part comprising a gate connecting the inner space to the outer space, the entrance control part being configured to change a size of the gate according to a temperature so as to control the amount of a gas flowing through the gate.

10. The gas storage structure of claim 9, wherein the gas storage part comprises a porous structure.

11. The gas storage structure of claim 10, wherein an outer wall of the gas storage part is defined by lattice spaces of the porous structure.

12. The gas storage structure of claim 10, wherein the gate has a size greater than that of a lattice space of the gas storage part at a temperature higher than a critical temperature, wherein the critical temperature is higher than that of a vaporization point of the gas and lower than that of a melting point of the entrance control part.

13. The gas storage structure of claim 12, wherein the gate has a size equal to or less than that of the lattice space of the gas storage part at a temperature less than the critical temperature.

14. The gas storage structure of claim 9, wherein the entrance control part is formed of a material having a melting point less than that of a material constituting the gas storage part.

15. The gas storage structure of claim 1, wherein the gas storage part includes carbon based nano-structures.

16. The gas storage structure of claim 1, wherein each of the lattice spaces is a space defined by carbon atoms.

17. The gas storage structure of claim 1, wherein the gas storage part includes a porous polymer.

18. The gas storage structure of claim 17, wherein the lattice spaces are spaces defined by atoms or molecules that constitute the polymer.

* * * * *